United States Patent
Sawanishi et al.

(10) Patent No.: US 10,625,365 B2
(45) Date of Patent: Apr. 21, 2020

(54) RESISTANCE SPOT WELDING METHOD

(71) Applicant: JFE STEEL CORPORATION, Chiyoda-ku, Tokyo (JP)

(72) Inventors: Chikaumi Sawanishi, Tokyo (JP); Yasuaki Okita, Tokyo (JP); Hiroshi Matsuda, Tokyo (JP); Rinsei Ikeda, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 174 days.

(21) Appl. No.: 15/526,125

(22) PCT Filed: Nov. 18, 2015

(86) PCT No.: PCT/JP2015/005771
§ 371 (c)(1),
(2) Date: May 11, 2017

(87) PCT Pub. No.: WO2016/088319
PCT Pub. Date: Jun. 9, 2016

(65) Prior Publication Data
US 2017/0312846 A1   Nov. 2, 2017

(30) Foreign Application Priority Data

Dec. 1, 2014   (JP) ................... 2014-243340

(51) Int. Cl.
*B23K 11/11*   (2006.01)
*B23K 11/24*   (2006.01)
(Continued)

(52) U.S. Cl.
CPC ............ *B23K 11/11* (2013.01); *B23K 11/115* (2013.01); *B23K 11/16* (2013.01); *B23K 11/24* (2013.01);
(Continued)

(58) Field of Classification Search
CPC ....... B23K 11/115; B23K 11/16; B23K 11/24; B23K 11/255; B23K 11/256; B23K 11/257
(Continued)

(56) References Cited

U.S. PATENT DOCUMENTS 4,135,076 A * 1/1979 Beneteau ............... B23K 11/31
219/89
4,503,312 A * 3/1985 Nakata ................ B23K 11/255
219/110

(Continued)

FOREIGN PATENT DOCUMENTS

CN         102430851 A     5/2012
CN         102689088 A     9/2012
(Continued)

OTHER PUBLICATIONS

Sep. 3, 2018, Office Action issued by the State Intellectual Property Office in the corresponding Chinese Patent Application No. 201580065285.X with English language Search Report.

(Continued)

*Primary Examiner* — Seth W. Mackay-Smith
(74) *Attorney, Agent, or Firm* — Kenja IP Law PC (57) ABSTRACT

The resistance spot welding method includes performing actual welding to squeeze, by a pair of electrodes (14), a sheet combination with a sheet thickness ratio of more than 3 in which a thin sheet (11) is overlapped on at least one face of two or more overlapping thick sheets (12, 13), and passing a current while applying an electrode force to join the sheet combination, wherein in the actual welding, a pattern of the current and the electrode force is divided into two or more steps including a first step and a second step to perform welding, and an electrode force F1 in the first step and an electrode force F2 in the second step satisfy a relationship $F1 > F2$.

6 Claims, 2 Drawing Sheets (51) Int. Cl.
  *B23K 11/16* (2006.01)
  *B23K 11/25* (2006.01)
  *B23K 11/36* (2006.01)
(52) U.S. Cl.
  CPC .......... *B23K 11/255* (2013.01); *B23K 11/257* (2013.01); *B23K 11/362* (2013.01)
(58) Field of Classification Search
  USPC ...................................................... 219/91.22
  See application file for complete search history.

(56) References Cited

U.S. PATENT DOCUMENTS

| | | | | |
|---|---|---|---|---|
| 5,347,105 | A * | 9/1994 | Kawai | B23K 11/257 219/109 |
| 5,484,975 | A * | 1/1996 | Itatsu | B23K 11/115 219/86.7 |
| 5,906,755 | A * | 5/1999 | Arasuna | B23K 11/311 219/86.41 |
| 6,130,396 | A | 10/2000 | Hasegawa et al. | |
| 6,232,572 | B1 * | 5/2001 | Kanjo | B23K 11/115 219/110 |
| 8,993,918 | B2 | 3/2015 | Sakai et al. | |
| 9,073,146 | B2 * | 7/2015 | Sakai | B23K 11/255 |
| 9,475,147 | B2 | 10/2016 | Taniguchi et al. | |
| 9,517,526 | B2 | 12/2016 | Sakamoto | |
| 10,040,145 | B2 * | 8/2018 | Furusako | B23K 11/16 |
| 10,279,418 | B2 * | 5/2019 | Edwards, II | B23K 11/115 |
| 2002/0053555 | A1 * | 5/2002 | Matsuyama | B23K 11/252 219/110 |
| 2005/0184031 | A1 * | 8/2005 | Sun | B23K 11/002 219/117.1 |
| 2010/0243616 | A1 * | 9/2010 | Goto | B23K 11/0026 219/117.1 |
| 2011/0097594 | A1 * | 4/2011 | Tanaka | B23K 11/115 428/594 |
| 2011/0180518 | A1 * | 7/2011 | Hasegawa | B23K 11/115 219/108 |
| 2012/0055910 | A1 * | 3/2012 | Sakai | B23K 11/115 219/127 |
| 2012/0141829 | A1 * | 6/2012 | Oikawa | B23K 11/115 428/683 |
| 2013/0048613 | A1 * | 2/2013 | Sigler | B23K 11/115 219/91.2 |
| 2013/0248505 | A1 * | 9/2013 | Anayama | B23K 11/115 219/130.01 |
| 2014/0305912 | A1 * | 10/2014 | Taniguchi | B23K 11/24 219/91.22 |
| 2014/0308070 | A1 * | 10/2014 | Taniguchi | B23K 11/11 403/271 |
| 2015/0060414 | A1 * | 3/2015 | Riether | B23K 35/0255 219/86.31 |
| 2015/0174690 | A1 | 6/2015 | Furusako et al. | |
| 2016/0082543 | A1 * | 3/2016 | Wakabayashi | B23K 11/115 219/86.31 |
| 2018/0281102 | A1 * | 10/2018 | Sawanishi | B23K 11/11 |

FOREIGN PATENT DOCUMENTS

| | | | | |
|---|---|---|---|---|
| CN | 103111741 | A | 5/2013 | |
| CN | 103889634 | A | 6/2014 | |
| JP | H1133743 | A | 2/1999 | |
| JP | 2003071569 | A | 3/2003 | |
| JP | 2003251469 | A | 9/2003 | |
| JP | 2004358500 | A | 12/2004 | |
| JP | 2008290099 | A | 12/2008 | |
| JP | 2014200797 | A | 10/2014 | |
| WO | 2007077393 | A2 | 7/2007 | |
| WO | 2014045431 | A1 | 3/2014 | |
| WO | WO-2014045431 | A1 * | 3/2014 | ............. B23K 11/16 |
| WO | 2014136507 | A1 | 9/2014 | |
| WO | 2014156290 | A1 | 10/2014 | |
| WO | 2015170687 | A1 | 11/2015 | |

OTHER PUBLICATIONS

Mar. 2, 2018, Office Action issued by the Korean Intellectual Property Office in the corresponding Korean Patent Application No. 10-2017-7015146 with English language Concise Statement of Relevance.

Nov. 15, 2017, Extended European Search Report issued by the European Patent Office in the corresponding European Patent Application No. 158658421.

Dec. 20, 2016, Office Action issued by the Japan Patent Office in the corresponding Japanese Patent Application No. 2016-513172, with English language Concise Statement of Relevance.

Feb. 23, 2016, International Search Report issued in the International Patent Application No. PCT/JP2015/005771.

* cited by examiner

RESISTANCE SPOT WELDING METHOD

TECHNICAL FIELD

The disclosure relates to a resistance spot welding method. The disclosure is particularly intended to ensure a stable nugget diameter without splashing regardless of disturbances such as current shunting or a sheet gap, in a sheet combination of three or more sheets with a high sheet thickness ratio in which a thin sheet is overlapped on at least one face of two or more overlapping thick sheets.

BACKGROUND

Steel sheets overlapped on each other are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

The joining strength of the resistance spot weld depends on the nugget diameter. Particularly in the case where high joining strength is required as in automotive parts and the like, it is important to ensure at least a predetermined nugget diameter.

Typically, in the case where the electrode force and the welding time are constant, the nugget diameter gradually increases as the welding current increases. When the welding current reaches a certain value or more, however, splashing occurs. Splashing is a phenomenon in which molten metal splatters between the steel sheets. Splashing not only is dangerous, but also degrades appearance as molten metal adheres around the weld, and causes variations in nugget diameter and joint tensile strength. This results in unstable joint quality.

Regarding the structures of automotive parts, for example, a center pillar has a structure in which a reinforcement is sandwiched between an outer portion and an inner portion. In this structure, three or more steel sheets need to be overlapped and spot welded, unlike in the case of simply spot welding two overlapping steel sheets.

Recent demand for more improved crash safety of automobiles has encouraged increases in strength and thickness of reinforcements and the like. This often creates the need to spot weld a sheet combination in which an outer portion (thin sheet) with small sheet thickness is located on the outer side and an inner portion and a reinforcement (thick sheets) with large sheet thickness are located on the inner side. Of the steel sheets in the sheet combination, a steel sheet with relatively small sheet thickness is referred to as a thin sheet, and a steel sheet with relatively large sheet thickness as a thick sheet. The same applies hereafter.

It is known that, in the case where such a sheet combination of three or more sheets with a high sheet thickness ratio ((the total thickness of the sheet combination)/(the sheet thickness of the thinnest steel sheet in the sheet combination)) is subjected to conventional spot welding of maintaining a constant electrode force and welding current, a nugget of a required size is hard to be formed between the outermost thin sheet (in contact with the electrode tip) and the thick sheet. This tendency is particularly noticeable when the sheet thickness ratio of the sheet combination is more than 3, or further 5 or more.

This is because the temperature tends not to increase between the outermost thin sheet and the thick sheet due to cooling by the electrode tip.

The nugget is typically formed by heat generated by volume resistance according to the specific resistance of each steel sheet from near the center between the electrodes. Since the nugget grows large between the thick sheets located near the center between the electrodes before the nugget grows to the thin sheet side, splashing occurs as it cannot be prevented by the applied electrode force. It is therefore difficult to obtain a nugget of a required size between the thin sheet and the thick sheet without splashing in such a sheet combination.

In the case where the outermost thin sheet is the outer portion, mild steel is often used as the steel sheet because formability is more important than strength. Meanwhile, the thick sheet is a strength reinforcing member, for which a high tensile strength steel sheet is often used. In such a sheet combination, the heat generation position tends to be closer to the high tensile strength steel sheet with high specific resistance. This further hinders the nugget formation between the thick sheet and the thin sheet (mild steel). Besides, when the steel sheet used is a coated steel sheet, the coated layer that has molten at a low temperature expands the current path between the steel sheets, causing a decrease in current density. This makes the nugget formation on the thin sheet side more difficult.

Thus, a nugget of a required size is hard to be formed between the thin and thick sheets in the aforementioned sheet combination of three or more sheets with a high sheet thickness ratio. The welding condition for obtaining an appropriate nugget diameter is therefore very limited.

In addition, in the case where disturbances are present during welding such as when a point that has already been welded (existing weld) is present near the current welding point or when the parts to be welded have significant surface roughness and a contact point of the parts to be welded is present near the welding point, part of the welding current is shunted into such an existing weld or contact point during welding. In this state, even when welding is performed under a predetermined condition, the current density at the position to be welded which is directly above or below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are firmly restrained due to surface roughness, member shape, etc., a larger sheet gap between the steel sheets causes a smaller contact diameter of the steel sheets, which may hinder the obtainment of a nugget of a required diameter or facilitate splashing.

Given that the welding condition for obtaining an appropriate nugget diameter in a sheet combination of three or more sheets with a high sheet thickness ratio is very limited as mentioned above, these disturbances may have significant effects.

As a resistance spot welding method for such a sheet combination of three or more sheets with a high sheet thickness ratio, for example, JP 2003-071569 A (PTL 1) proposes the following technique. In a sheet combination with a high sheet thickness ratio in which a thin sheet is further overlapped on two overlapping thick sheets, a bearing surface one level higher than a general portion is partly formed at the welding position of the thin sheet, and the end of the electrode facing the thin sheet is made spherical. In initial welding, the thin sheet and the adjacent thick sheet are welded with a low electrode force so as to crush the bearing surface of the thin sheet. After this, the two thick sheets are welded with a high electrode force. A required nugget is thus formed between the thin and thick sheets.

JP 2003-251469 A (PTL 2) proposes the following technique. In a method of squeezing, by a pair of electrode tips, a workpiece in which a thin sheet with low rigidity is overlapped on two thick sheets with high rigidity and spot welding the workpiece, the electrode force applied to the workpiece by the electrode tip in contact with the thin sheet lowest in rigidity is lower than the electrode force applied to the workpiece by the electrode tip in contact with the thick sheet, to form a nugget between the thin and thick sheets. The weld strength of the workpiece is thus enhanced.

JP 2004-358500 A (PTL 3) proposes the following technique. In a method of spot welding parts to be welded with a high sheet thickness ratio, after passing a welding current while applying a first electrode force to the parts to be welded, the current passage is stopped, and then a welding current is passed again while applying a second electrode force higher than the first electrode force in the state where the parts to be welded remain squeezed. Desirably, the current value of the welding current in the process of applying the first electrode force is changed in three steps of first to third steps, where the current in the second step is less than the current in each of the first and third steps. The joining strength of the parts to be welded with a high sheet thickness ratio is thus improved.

CITATION LIST

Patent Literatures

PTL 1: JP 2003-071569 A
PTL 2: JP 2003-251469 A
PTL 3: JP 2004-358500 A
PTL 4: JP H11-33743 A
PTL 5: JP 2008-290099 A

SUMMARY

Technical Problem

With the resistance spot welding method described in PTL 1, although the nugget is formed, there is a problem in that a process of forming, by pressing or the like, the bearing surface one level higher than the general portion in the welding part of the thin sheet beforehand is needed.

With the resistance spot welding method described in PTL 2, the nugget is formed between the thin and thick sheets by setting the electrode force applied to the workpiece by the electrode tip in contact with the thin sheet lowest in rigidity to be lower than the electrode force applied to the workpiece by the electrode tip in contact with the thick sheet. However, since the electrode force applied to the workpiece by the electrode tip in contact with the thin sheet is low, the contact area between the thin sheet and the electrode tip is small. As a result, the range subjected to the electrode force application is reduced, which facilitates splashing when forming a large nugget between the thick sheets. Besides, there is a possibility that a large strain occurs in the workpiece as, after squeezing the workpiece by the electrodes, a welding gun body to which the electrodes are attached is forcibly moved to produce different electrode forces.

With the resistance spot welding method described in PTL 3, current passage needs to be initially performed with a low electrode force. Here, if there is a sheet gap between the steel sheets, the contact area between the steel sheets decreases significantly, which poses difficulties in actual work.

PTL 1 to PTL 3 also have a common problem in that the welding condition for obtaining an appropriate nugget diameter in a sheet combination with a high sheet thickness ratio is very limited. Accordingly, for example in the case where disturbances such as a sheet gap or an existing weld are present, there is a need to derive an appropriate welding condition depending on the size of the sheet gap, the distance to the nearby existing weld, or the like to set an appropriate welding condition for every weld. Deriving such conditions through testing and the like requires considerable time and cost.

The present disclosure was completed in view of the above circumstances. One of the objects of the disclosure is to provide a resistance spot welding method with which a nugget of an appropriate diameter can be obtained without splashing regardless of disturbances such as a sheet gap or current shunting, in a sheet combination with a high sheet thickness ratio in which a thin sheet is overlapped on one face of two or more overlapping thick sheets.

Solution to Problem

We repeatedly conducted intensive study.

As mentioned above, the reason why splashing occurs or an appropriate nugget diameter is hard to be ensured in resistance spot welding for a sheet combination with a high sheet thickness ratio in which a thin sheet is overlapped on one face of two or more overlapping thick sheets is that the condition for obtaining an appropriate nugget diameter between the thin and thick sheets in particular is very limited and also the condition tends to vary due to disturbances such as a sheet gap or current shunting. As a result of conducting study in view of this, we made the following discoveries:

(1) To obtain an appropriate nugget diameter between the thin and thick sheets without splashing, when dividing the current pattern into two or more steps, it is important to satisfy the relationship $$F1 > F2$$

where F1 is the electrode force in the first step and F2 is the electrode force in the second step.

By satisfying this relationship, a weld fusion zone is formed first in the interface between the thick sheets in the first step, which makes it easier to ensure the current passage area between the thin and thick sheets. As a result, splashing is suppressed when forming a weld fusion zone between the thin and thick sheets in the second step.

Moreover, by setting the electrode force in the second step to be lower than the electrode force in the first step, the contact area between the thin and thick sheets and between the thin sheet and the electrode is reduced from that in the first step to thus increase the current density, with it being possible to facilitate sufficient heat generation to obtain a desired nugget diameter between the thin and thick sheets.

(2) In the case where the condition for obtaining an appropriate nugget diameter between the thin and thick sheets varies significantly due to disturbances, it is effective to perform the following adaptive control welding.

Before actual welding, test welding is performed, and the cumulative amount of heat generated per unit volume with which the parts to be welded can be welded favorably is calculated for each step from the sheet thickness of the parts to be welded and the welding time in the test welding. In the actual welding, a process of adjusting the welding current or voltage so as to generate the calculated amount of heat generated per unit volume and per unit time is performed to thus realize such adaptive control welding that responds to the variation of the condition.

The disclosure is based on the aforementioned discoveries and further studies.

We provide the following:

1. A resistance spot welding method comprising performing actual welding to squeeze, by a pair of electrodes, a sheet combination with a sheet thickness ratio of more than 3 in which a thin sheet is overlapped on at least one face of two or more overlapping thick sheets, and passing a current while applying an electrode force to join the sheet combination, wherein in the actual welding, a pattern of the current and the electrode force is divided into two or more steps including a first step and a second step to perform welding, and an electrode force F1 in the first step and an electrode force F2 in the second step satisfy a relationship $$F1 > F2.$$

2. The resistance spot welding method according to 1., further comprising, before the actual welding, performing test welding to store, for each of the steps, an amount of time variation of an instantaneous amount of heat generated per unit volume as a time variation curve and a cumulative amount of heat generated per unit volume, both the amount of time variation and the cumulative amount of heat being calculated from an electrical property between the electrodes in the case of forming an appropriate nugget by passing a current by constant current control, wherein in the actual welding, the stored time variation curve is used as a target and, in the case where a time variation of the instantaneous amount of heat generated per unit volume in the actual welding differs from the stored time variation curve in any of the steps, adaptive control welding is performed to control a current passage amount in order to compensate for the difference within a remaining welding time in the step so that a cumulative amount of heat generated per unit volume in the actual welding matches the stored cumulative amount of heat generated per unit volume.

3. The resistance spot welding method according to 1., wherein a current I1 in the first step and a current I2 in the second step in the actual welding satisfy a relationship $$I1 < I2.$$

4. The resistance spot welding method according to 2., wherein a current I1' in the first step and a current I2' in the second step in the test welding satisfy a relationship $$I1' < I2'.$$

5. The resistance spot welding method according to any of 1. to 4., wherein a cooling time between current passage in the first step and current passage in the second step in the actual welding is 5 cycles or more.

Advantageous Effect

It is thus possible to obtain a favorable nugget without splashing regardless of disturbances such as current shunting or a sheet gap, in a sheet combination of three or more sheets with a high sheet thickness ratio.

DETAILED DESCRIPTION

Detailed description is given below.

The disclosure relates to a resistance spot welding method including performing actual welding to squeeze, by a pair of electrodes, a sheet combination in which a thin sheet is overlapped on at least one face of two or more overlapping thick sheets, and passing a current while applying an electrode force to join the sheet combination. The disclosure is particularly intended for a sheet combination whose sheet thickness ratio ((the total thickness of the sheet combination)/(the sheet thickness of the thinnest steel sheet (metal sheet) in the sheet combination)) is more than 3 or further 5 or more, for which it has been difficult to obtain a nugget of a required size between the thin and thick sheets without splashing. The upper limit of the sheet thickness ratio is not particularly limited, but is typically 12.

Any welding device that includes a pair of upper and lower electrodes and is capable of freely controlling each of the electrode force and the welding current during welding may be used in the resistance spot welding method according to the disclosure. The force mechanism (air cylinder, servomotor, etc.), the type (stationary, robot gun, etc.), the electrode shape, and the like are not particularly limited.

In the disclosure, the term "thin sheet" means a steel sheet with relatively small sheet thickness and the term "thick sheet" means a steel sheet with relatively large sheet thickness, of the steel sheets used in the sheet combination. Typically, the sheet thickness of the thin sheet is not more than ¾ of that of the steel sheet (thick sheet) with the largest sheet thickness.

In the actual welding in the resistance spot welding method according to the disclosure, the current/electrode force pattern is divided into two or more steps to perform welding.

Figure 1:
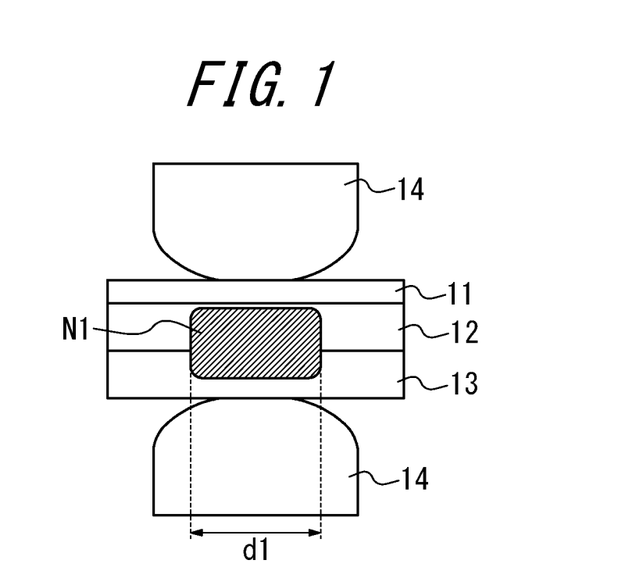
FIG. 1 is a diagram schematically illustrating an example of a nugget formation state in a first step in a resistance spot welding method according to one of the disclosed embodiments.

The following describes the resistance spot welding method according to the disclosure, using an example where a sheet combination in which two steel sheets (thick sheets) 12 and 13 are overlapped on each other and further a thin sheet 11 is overlapped on one face of the thick sheets 12 and 13 as illustrated in FIG. 1 is subjected to resistance spot welding by dividing the current/electrode force pattern into two steps. In the drawing, reference sign 14 is an electrode.

In the actual welding, the sheet combination is squeezed by the pair of upper and lower electrodes at a desired welding position, and electrode force application and current passage are started.

In the welding in the first step, the electrode force and the welding current are set to suppress splashing, and the part between the thick sheets 12 and 13 is molten to form a nugget N1. Forming the nugget between the thick sheets 12 and 13 first in this way makes it easier to ensure the current passage area between sheets, in particular between the thin sheet 11 and the thick sheet 12. As a result, splashing between the thin sheet 11 and the thick sheet 12 is suppressed in the current passage in the second step onward.

Figure 2:
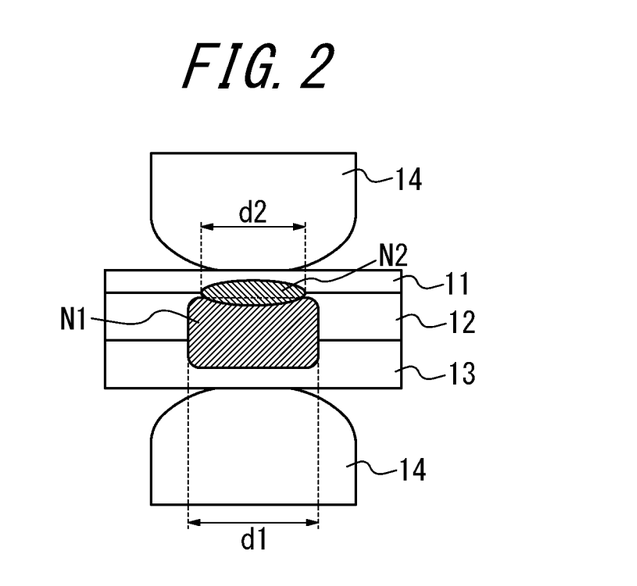
FIG. 2 is a diagram schematically illustrating an example of a nugget formation state in a second step in the resistance spot welding method according to one of the disclosed embodiments.

After such welding (current passage) in the first step, the welding in the second step is performed to form a nugget N2 between the thin sheet 11 and the thick sheet 12 as illustrated in FIG. 2. Here, it is important to satisfy the relationship $$F1 > F2$$

where F1 (kN) is the electrode force in the first step and F2 (kN) is the electrode force in the second step.

By satisfying this relationship, a weld fusion zone is formed first in the interface between the thick sheets 12 and 13 in the first step, which makes it easier to ensure the current passage area between the thin sheet 11 and the thick sheet 12.

Moreover, by setting the electrode force in the second step to be lower than the electrode force in the first step, the contact area between the thin sheet 11 and the thick sheet 12 and between the thin sheet 11 and the electrode 14 is reduced from that in the first step to thus increase the current density, with it being possible to facilitate sufficient heat generation to obtain a nugget of an appropriate diameter between the thin sheet 11 and the thick sheet 12 in the second step as illustrated in FIG. 2.

Preferably, the electrode force F2 satisfies the relationship $$0.5 t_m \leq F2 \leq 8 t_m$$

where $t_m$ (mm) is the sheet thickness of the thinnest steel sheet of the plurality of steel sheets constituting the sheet combination (the sheet thickness of the thin sheet 11 in FIGS. 1 and 2).

If the electrode force F2 (kN) is more than $8t_m$, the contact area expands excessively and the amount of heat generated is reduced, making it difficult to form a nugget of an appropriate diameter between the thin sheet 11 and the thick sheet 12. If the electrode force F2 (kN) is less than $0.5t_m$, the contact resistance between the electrode 14 and the thin sheet 11 is high, which promotes sparks and also promotes splashing between the thin sheet 11 and the thick sheet 12. A more preferable range is $0.6 t_m \leq F2 \leq 7 t_m$.

In the case where the appropriate condition tends to vary due to disturbances such as current shunting or a sheet gap, it is preferable to perform test welding before the aforementioned actual welding. From the sheet thickness of the parts to be welded and the welding time in the test welding, the cumulative amount of heat generated per unit volume with which the parts to be welded can be welded favorably is calculated for each step in the actual welding. Adaptive control welding of adjusting the welding current or voltage so as to generate the calculated amount of heat generated per unit volume and per unit time is then performed in the actual welding.

The test welding and the adaptive control welding are described below.

For the test welding, a welding test with the same steel type and thickness as the parts to be welded is performed by constant current control under various conditions in the state where there is no current shunting to an existing weld or sheet gap, to find an optimal condition in the test welding.

Then, for each step, the time variation of the instantaneous amount of heat generated per unit volume is stored as a time variation curve, and the cumulative amount of heat generated per unit volume is stored. Both the time variation and the cumulative amount are calculated from the electrical property between the electrodes during welding when the test welding is performed under the aforementioned condition.

The electrical property between the electrodes in the disclosure means the interelectrode resistance or the interelectrode voltage.

After the test welding, the adaptive control welding is performed in the actual welding.

In the adaptive control welding, the time variation curve stored in the test welding for each step is used a target. If the time variation of the instantaneous amount of heat generated per unit volume follows the stored time variation curve, the welding is continued without change and completed.

If the time variation of the instantaneous amount of heat generated per unit volume differs from the stored time variation curve, on the other hand, the adaptive control welding of controlling the current passage amount is carried out to compensate for the difference within the remaining welding time of the step so that the cumulative amount of heat generated per unit volume in the actual welding matches the stored cumulative amount of heat generated per unit volume. Thus, the required cumulative amount of heat generated can be ensured to obtain an appropriate nugget diameter even in the state where the effects of disturbances such as current shunting or a sheet gap are significant.

In the disclosure, the method of calculating the amount of heat generated per unit volume is not particularly limited. JP H11-33743 A (PTL 4) describes an example of the method, which may be used in this disclosure. The following is the procedure of calculating the cumulative amount Q of heat generated per unit volume according to this method.

Let t be the total thickness of the parts to be welded, r be the electrical resistivity of the parts to be welded, V be the interelectrode voltage, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q = (V \cdot I)/(S \cdot t) \tag{1}$$

The electrical resistance R of the columnar portion is given by the following Equation (2):

$$R = (r \cdot t)/S \tag{2}$$

Solving Equation (2) for S and substituting the solution into Equation (1) yields the amount q of heat generated as shown by the following Equation (3):

$$q = (V \cdot I \cdot R)/(r \cdot t^2) = (V^2)/(r \cdot t^2) \tag{3}$$

As is clear from Equation (3), the amount q of heat generated per unit volume and per unit time can be calculated from the interelectrode voltage V, the total thickness t of the parts to be welded, and the electrical resistivity r of the parts to be welded, and is not affected by the contact area S of the electrodes and the parts to be welded. Although the amount of heat generated is calculated from the interelectrode voltage V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 4, the cumulative amount Q may be calculated by any other method.

In the case of performing constant current control in the actual welding for a sheet combination with a high sheet thickness ratio or in a work state where the effects of a sheet gap or current shunting are significant, it is preferable to satisfy the relationship $$I1 < I2$$

where I1 is the current in the first step and I2 is the current in the second step in the actual welding.

This facilitates heat generation and melting between the thin sheet 11 and the thick sheet 12 in the second step more actively.

In the case of performing the aforementioned adaptive control welding, it is preferable to satisfy the relationship $$I1' < I2'$$

where I1' is the current in the first step and I2' is the current in the second step in the test welding.

In the case where splashing is highly likely to occur in the second step in such a sheet combination or work state for which the appropriate condition is limited, a cooling time (hereafter also denoted by Tc) is preferably provided between the current passage in the first step and the current passage in the second step in the actual welding.

By decreasing the temperature after melting the part between the thick sheets 12 and 13 in the first step, the nugget growth between the thick sheets 12 and 13 in the second step can be prevented to suppress splashing.

The cooling time is preferably 5 cycles or more (hereafter all time units are expressed by the number of cycles at 50 Hz).

As mentioned earlier, heat generation and melting between the thin sheet 11 and the thick sheet 12 in the second step is facilitated by the increase in current density between the thin sheet 11 and the thick sheet 12. In detail, by setting the electrode force F2 (kN) in the second step to be lower than the electrode force F1 (kN) in the first step, the current density between the thin sheet 11 and the thick sheet 12 increases in the second step, thus facilitating heat generation and melting between the thin sheet 11 and the thick sheet 12.

Here, if the cooling time is less than 5 cycles, the current passage in the second step starts in the state where the temperature between the thick sheets 12 and 13 is high. As a result, remelting between the thick sheets 12 and 13 may be promoted in the second step even though the current density between the thin sheet 11 and the thick sheet 12 is increased by setting the electrode force F2 (kN) in the second step to be lower than the electrode force F1 (kN) in the first step. This not only makes it impossible to obtain a desired nugget diameter between the thin sheet 11 and the thick sheet 12, but also incites splashing between the thick sheets 12 and 13. If the cooling time is 5 cycles or more, on the other hand, heat generation and melting between the thin sheet 11 and the thick sheet 12 can be facilitated while preventing excessive nugget growth between the thick sheets 12 and 13 more reliably. The cooling time is more preferably more than 5 cycles, and further preferably 7 cycles or more.

If the cooling time is more than 100 cycles, not only the work time increases excessively, but also the heat generation efficiency between the thin sheet 11 and the thick sheet 12 to be molten in the second step decreases. Accordingly, the upper limit of the cooling time is preferably 100 cycles.

Preferable welding times T1 and T2 in the first and second steps in the actual welding are typically about 5 cycles to 50 cycles and about 1 cycle to 20 cycles, respectively.

The steel sheets to be welded by the resistance spot welding method according to the disclosure are not particularly limited. The resistance spot welding method may be used for the welding of steel sheets and coated steel sheets having various strengths from mild steel to ultra high tensile strength steel and light metal sheets of aluminum alloys and the like. The resistance spot welding method may also be used for a sheet combination of four or more metal sheets in which thin sheets are overlapped on both faces of two or more overlapping thick sheets.

Current passage in a third step onward may be performed to heat-treat the weld after the current passage in the first and second steps for nugget formation.

Figure 3:
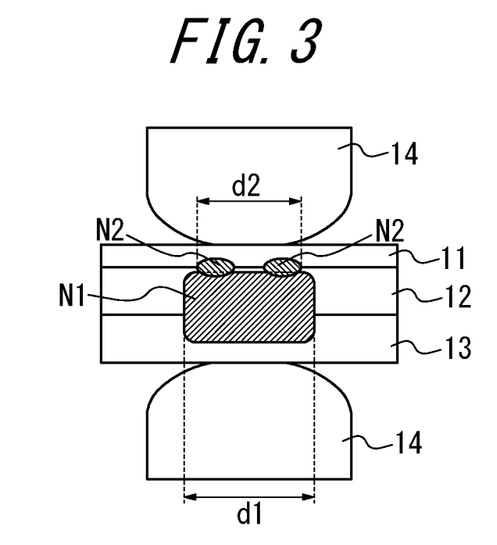
FIG. 3 is a diagram schematically illustrating an example of the nugget formation state in the second step in the resistance spot welding method according to one of the disclosed embodiments.

In the first step, the part between the thin sheet 11 and the thick sheet 12 may be partly molten as long as splashing does not occur. In the second step, the part between the thin sheet 11 and the thick sheet 12 may be molten uniformly as illustrated in FIG. 2, or only the outer peripheral part may be molten in the shape of a ring while the center part remains not molten as illustrated in FIG. 3.

JP 2008-290099 A (PTL 5) discloses "a resistance spot welding method wherein, when squeezing a workpiece of a sheet combination in which a thin sheet is overlapped on one face of two or more overlapping thick sheets by a pair of electrodes and resistance spot welding it while applying an electrode force, the welding is divided into two steps where the first step involves welding with a low electrode force and a high current and the second step involves welding with a higher electrode force than the electrode force in the first step, the electrode in contact with the thin sheet of the fixed workpiece being a fixed electrode of a welding gun and the electrode in contact with the thick sheet being a movable electrode of the welding gun".

Thus, with the welding method in PTL 5, the electrode in contact with the thin sheet is used as the fixed electrode and the electrode in contact with the thick sheet as the movable electrode, and the phenomenon resulting from this arrangement is utilized to perform initial welding with a low electrode force and a high current and subsequent welding with a high electrode force, to form a nugget of an appropriate diameter between the thin and thick sheets and between the thick sheets. With the welding method according to the disclosure, on the other hand, in the case of welding a sheet combination in which a thin sheet is overlapped only on one face of overlapping thick sheets, the electrode in contact with the thin sheet is used as the movable electrode and the electrode in contact with the thick sheet as the fixed electrode according to a conventional method. The welding method according to the disclosure is therefore different from the welding method in PTL 5.

EXAMPLES

For each sheet combination of three steel sheets shown in Table 1 and FIGS. 1 to 4, resistance spot welding was performed under each condition shown in Table 2 to produce a joint.

The result in the case where the control mode is "constant current" in Table 2 indicates the result of performing welding by constant current control under the welding condition shown in Table 2. The result in the case where the control mode is "adaptive control" in Table 2 indicates the result of, after performing test welding in the absence of disturbances such as a sheet gap under the welding condition in Table 2 and storing the time variation of the instantaneous amount of heat generated per unit volume, performing adaptive control welding of adjusting the current with reference to the time variation curve of the instantaneous amount of heat generated per unit volume obtained in the test welding.

Figure 4:
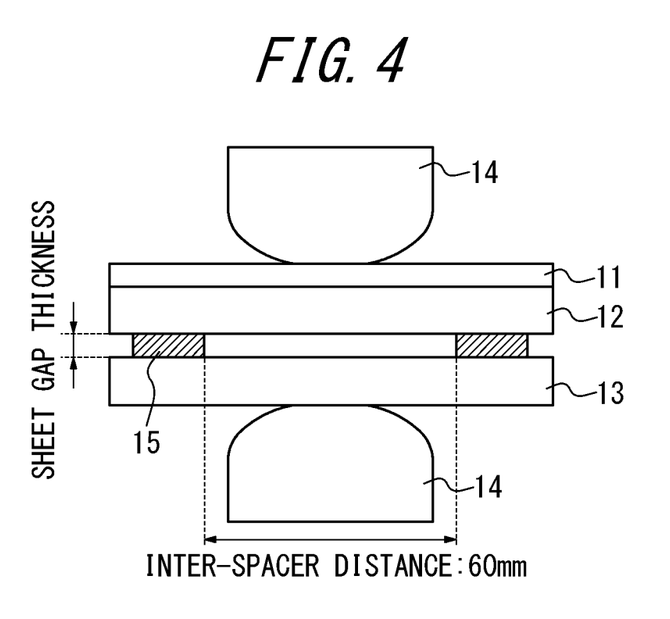
FIG. 4 is a diagram schematically illustrating the case of welding a sheet combination having a sheet gap in Examples.

Upon producing some of the joints, spacers 15 (interspacer distance: 60 mm) were inserted between the thick sheets 12 and 13 as illustrated in FIG. 4, and the sheet combination was clamped from above and below (not illustrated), to create a sheet gap of any of various sheet gap thicknesses.

An inverter DC resistance spot welder was used as the welder, and chromium copper electrodes with 6 mm face diameter DR-shaped tips were used as the electrodes. The electrode in contact with the thin sheet was the movable electrode, and the electrode in contact with the thick sheet was the fixed electrode.

For each obtained joint, the weld was cut and etched in section, and then observed with an optical microscope to measure each of the nugget diameter d1 between the thick sheets and the nugget diameter d2 (mm) between the thin and thick sheets. Each sample in which the nugget diameters d1 and d2 were both $4\sqrt{t'}$ or more (t': the sheet thickness (mm) of the thinner steel sheet of the adjacent two steel sheets) and no splashing occurred was evaluated as good. Each sample in which any of the nugget diameters d1 and d2 was less than $4\sqrt{t'}$ or splashing occurred was evaluated as poor.

TABLE 1

| Sheet combination No. | Steel sheet (thin sheet) of reference sign 11 in the drawings | Steel sheet (thick sheet) of reference sign 12 in the drawings | Steel sheet (thick sheet) of reference sign 13 in the drawings | Sheet thickness ratio |
|---|---|---|---|---|
| A | 270 MPa-grade cold rolled steel sheet (sheet thickness: 0.7 mm) | 590 MPa-grade cold rolled steel sheet (sheet thickness: 1.4 mm) | 590 MPa-grade cold rolled steel sheet (sheet thickness: 1.4 mm) | 5.0 |
| B | 270 MPa-grade cold rolled steel sheet (sheet thickness: 0.7 mm) | 980 MPa-grade cold rolled steel sheet (sheet thickness: 2.0 mm) | 980 MPa-grade cold rolled steel sheet (sheet thickness: 2.0 mm) | 6.7 |
| C | 270 MPa-grade GA steel sheet (sheet thickness: 0.7 mm) | 780 MPa-grade GA steel sheet (sheet thickness: 1.6 mm) | 780 MPa-grade GA steel sheet (sheet thickness: 1.6 mm) | 5.6 |
| D | 270 MPa-grade GA steel sheet (sheet thickness: 0.65 mm) | 1180 MPa-grade GA steel sheet (sheet thickness: 1.6 mm) | 980 MPa-grade GA steel sheet (sheet thickness: 1.8 mm) | 6.2 |
| E | 270 MPa-grade cold rolled steel sheet (sheet thickness: 0.7 mm) | 1470 MPa-grade cold rolled steel sheet (sheet thickness: 1.6 mm) | 980 MPa-grade GA steel sheet (sheet thickness: 1.6 mm) | 5.6 |
| F | 270 MPa-grade GA steel sheet (sheet thickness: 0.8 mm) | 980 MPa-grade cold rolled steel sheet (sheet thickness: 1.8 mm) | 980 MPa-grade GA steel sheet (sheet thickness: 1.8 mm) | 5.5 |
| G | 270 MPa-grade cold rolled steel sheet (sheet thickness: 0.6 mm) | 1180 MPa-grade cold rolled steel sheet (sheet thickness: 1.6 mm) | 1180 MPa-grade cold rolled steel sheet (sheet thickness: 1.6 mm) | 6.3 |
| H | 440 MPa-grade GA steel sheet (sheet thickness: 0.7 mm) | 980 MPa-grade cold rolled steel sheet (sheet thickness: 1.8 mm) | 980 MPa-grade GA steel sheet (sheet thickness: 1.8 mm) | 6.1 |

TABLE 2

| Joint No. | Sheet combination No. | First step Electrode force F1 (kN) | First step Welding current I1 (or I1') (kA) | First step Welding time T1 (cycles) | Cooling time Tc (cycles) | Second step Electrode force F2 (kN) | Second step Welding current I2 (or I2') (kA) | Second step Welding time T2 (cycles) | Control mode | Sheet gap thickness | Evaluation | Remarks |
|---|---|---|---|---|---|---|---|---|---|---|---|---|
| 1 | A | 4 | 6 | 16 | 10 | 3.5 | 7.5 | 6 | Constant current | No sheet gap | Good | Example |
| 2 | A | 4 | 6 | 16 | 10 | 3.5 | 7.5 | 6 | Constant current | 0.5 mm | Good | Example |
| 3 | B | 5 | 7 | 20 | 50 | 1 | 10.5 | 5 | Adaptive control | No sheet gap | Good | Example |
| 4 | B | 5 | 7 | 20 | 50 | 1 | 10.5 | 5 | Adaptive control | 0.5 mm | Good | Example |
| 5 | B | 5 | 7 | 20 | 50 | 1 | 10.5 | 5 | Adaptive control | 1 mm | Good | Example |
| 6 | C | 4.5 | 6.5 | 15 | 15 | 1.5 | 10 | 4 | Adaptive control | No sheet gap | Good | Example |
| 7 | C | 4.5 | 6.5 | 15 | 15 | 1.5 | 10 | 4 | Adaptive control | 0.5 mm | Good | Example |
| 8 | D | 4.5 | 6 | 21 | 10 | 3.5 | 7 | 5 | Constant current | No sheet gap | Good | Example |
| 9 | D | 4.5 | 6 | 21 | 10 | 3.5 | 7 | 5 | Adaptive control | 0.5 mm | Good | Example |
| 10 | E | 4 | 5.5 | 20 | 6 | 3 | 7.5 | 4 | Constant current | No sheet gap | Good | Example |
| 11 | E | 4 | 5.5 | 20 | 6 | 3 | 7.5 | 4 | Adaptive control | 0.3 mm | Good | Example |

TABLE 2-continued

| Joint No. | Sheet combination No. | First step | | | Cooling time Tc (cycles) | Second step | | | Control mode | Sheet gap thickness | Evaluation | Remarks |
|---|---|---|---|---|---|---|---|---|---|---|---|---|
| | | Electrode force F1 (kN) | Welding current I1 (or I1') (kA) | Welding time T1 (cycles) | | Electrode force F2 (kN) | Welding current I2 (or I2') (kA) | Welding time T2 (cycles) | | | | |
| 12 | F | 6 | 6 | 22 | 20 | 2 | 8.5 | 5 | Constant current | No sheet gap | Good | Example |
| 13 | F | 6 | 6 | 22 | 20 | 2 | 8.5 | 5 | Adaptive control | 0.7 mm | Good | Example |
| 14 | G | 3.5 | 5.5 | 18 | 40 | 1.5 | 10 | 5 | Constant current | No sheet gap | Good | Example |
| 15 | G | 3.5 | 5.5 | 18 | 40 | 1.5 | 10 | 5 | Adaptive control | 0.5 mm | Good | Example |
| 16 | H | 5 | 6 | 21 | 35 | 4 | 11 | 3 | Constant current | No sheet gap | Good | Example |
| 17 | H | 5 | 6 | 21 | 35 | 4 | 11 | 3 | Adaptive control | 1 mm | Good | Example |
| 18 | B | 5 | 7 | 20 | — | — | — | — | Constant current | No sheet gap | Poor (insufficient nugget) | Comparative Example |
| 19 | B | 5 | 10 | 20 | — | — | — | — | Constant current | 1 mm | Poor (splashing) | Comparative Example |
| 20 | B | 5 | 7 | 20 | — | — | — | — | Adaptive control | 1 mm | Poor (insufficient nugget) | Comparative Example |

* The welding current in the case where the control mode is "adaptive control" is the welding current in test welding.

In all Examples, no splashing occurred, and a nugget with a diameter of $4\sqrt{t'}$ or more was obtained between the thick sheets and between the thin and thick sheets.

In all Comparative Examples outside the range according to the disclosure, on the other hand, either splashing occurred or a sufficient nugget was not formed.

REFERENCE SIGNS LIST 11 steel sheet (thin sheet)
12, 13 steel sheet (thick sheet)
14 electrode
15 spacer

The invention claimed is:

1. A resistance spot welding method comprising
performing actual welding to squeeze, by a pair of electrodes, a sheet combination with a sheet thickness ratio of more than 3 in which a thin sheet is overlapped on at least one face of two or more overlapping thick sheets, and passing a current while applying an electrode force to join the sheet combination,
wherein in the actual welding, a pattern of the current and the electrode force is divided into two or more steps including a first step and a second step to perform welding, and an electrode force F1 in the first step and an electrode force F2 in the second step satisfy a relationship $F1 > F2$, wherein current passage in the first step is performed to form a nugget and current passage in the second step is performed to further form the nugget, and
wherein a cooling time between current passage in the first step and current passage in the second step in the actual welding is more than 5 cycles and 100 cycles or less, and time units are expressed by the number of cycles at 50 Hz.

2. The resistance spot welding method according to claim 1, further comprising, before the actual welding,
performing test welding to store, for each of the steps, an amount of time variation of an instantaneous amount of heat generated per unit volume as a time variation curve and a cumulative amount of heat generated per unit volume, both the amount of time variation and the cumulative amount of heat being calculated from an electrical property between the electrodes in the case of forming an appropriate nugget by passing a current by constant current control,
wherein in the actual welding, the stored time variation curve is used as a target and, in the case where a time variation of the instantaneous amount of heat generated per unit volume in the actual welding differs from the stored time variation curve in any of the steps, adaptive control welding is performed to control a current passage amount in order to compensate for the difference within a remaining welding time in the step so that a cumulative amount of heat generated per unit volume in the actual welding matches the stored cumulative amount of heat generated per unit volume.

3. The resistance spot welding method according to claim 2,
wherein a current I1' in the first step in the test welding and a current I2' in the second step in the test welding satisfy a relationship $I1' < I2'$.

4. The resistance spot welding method according to claim 1,
wherein a current I1 in the first step and a current I2 in the second step in the actual welding satisfy a relationship $I1 < I2$.

5. The resistance spot welding method according to claim 1, wherein the cooling time between current passage in the first step and current passage in the second step in the actual welding is 15 cycles or more and 100 cycles or less.

6. The resistance spot welding method according to claim 1, wherein the cooling time between current passage in the first step and current passage in the second step in the actual welding is 10 cycles or more and 100 cycles or less.

* * * * *